(12) United States Patent
Yamamura et al.

(10) Patent No.: US 10,478,782 B2
(45) Date of Patent: Nov. 19, 2019

(54) COMPOSITE HOLLOW FIBER MEMBRANE AND METHOD FOR PRODUCING SAME

(71) Applicant: TORAY INDUSTRIES, INC., Tokyo (JP)

(72) Inventors: Gohei Yamamura, Otsu (JP); Koichi Takada, Otsu (JP); Ryuichiro Hiranabe, Otsu (JP); Hiroki Tomioka, Otsu (JP)

(73) Assignee: TORAY INDUSTRIES, INC., Tokyo (JP)

( * ) Notice: Subject to any disclaimer, the term of this patent is extended or adjusted under 35 U.S.C. 154(b) by 77 days.

(21) Appl. No.: 15/569,859

(22) PCT Filed: Apr. 28, 2016

(86) PCT No.: PCT/JP2016/063431
§ 371 (c)(1),
(2) Date: Oct. 27, 2017

(87) PCT Pub. No.: WO2016/175308
PCT Pub. Date: Nov. 3, 2016

(65) Prior Publication Data
US 2018/0117537 A1    May 3, 2018

(30) Foreign Application Priority Data

Apr. 28, 2015 (JP) ................................. 2015-091194

(51) Int. Cl.
| | | |
|---|---|---|
| *B01D 69/08* | (2006.01) | |
| *B01D 69/00* | (2006.01) | |
| *B01D 69/02* | (2006.01) | |
| *B01D 69/10* | (2006.01) | |
| *B01D 69/12* | (2006.01) | |
| *B01D 71/14* | (2006.01) | |

(52) U.S. Cl.
CPC ........... *B01D 69/081* (2013.01); *B01D 69/02* (2013.01); *B01D 69/10* (2013.01); *B01D 69/12* (2013.01); *B01D 71/14* (2013.01)

(58) Field of Classification Search
None
See application file for complete search history.

(56) References Cited

U.S. PATENT DOCUMENTS

| | | | | |
|---|---|---|---|---|
| 4,322,381 | A | * | 3/1982 | Joh ........................ B01D 69/08 210/500.23 |
| 4,713,292 | A | | 12/1987 | Takemura et al. |
| 4,802,942 | A | | 2/1989 | Takemura et al. |
| 2009/0297822 | A1 | | 12/2009 | Fujimura et al. |
| 2013/0140236 | A1 | | 6/2013 | Tokimi et al. |

FOREIGN PATENT DOCUMENTS

| | | |
|---|---|---|
| EP | 1 127 608 A1 | 8/2001 |
| EP | 3 278 867 A1 | 2/2018 |
| JP | 51-70316 A | 6/1976 |
| JP | 61-408 A | 1/1986 |
| JP | 62-1404 A | 1/1987 |
| JP | 62-97980 A | 5/1987 |
| JP | 63-194701 A | 8/1988 |
| JP | 64-151504 A | 1/1989 |
| JP | 4-65505 A | 3/1992 |
| JP | 2007-289927 A | 11/2007 |
| JP | 2008-178814 A | 8/2008 |
| JP | 2012-115835 A | 6/2012 |
| WO | WO 2007/043553 A1 | 4/2007 |
| WO | WO 2012/026373 A1 | 3/2012 |
| WO | WO 2016/052675 A1 | 4/2016 |

OTHER PUBLICATIONS

International Search Report for PCT/JP2016/063431 (PCT/ISA/210) dated Jun. 21, 2016.
Written Opinion of the International Searching Authority for PCT/JP2016/063431 (PCT/ISA/237) dated Jun. 21, 2016.
Extended European Search Report dated Nov. 22, 2018, in European Patent Application No. 16786584.9.

* cited by examiner

*Primary Examiner* — Krishnan S Menon
(74) *Attorney, Agent, or Firm* — Birch, Stewart, Kolasch & Birch, LLP

(57) ABSTRACT

Problems that the invention is to solve is to provide a composite hollow fiber membrane being excellent in separation performance and permeation performance, having high membrane strength, and capable of being easily produced, and a method for producing the same. The present invention relates to a composite hollow fiber membrane including at least a layer (A) and a layer (B), in which the composite hollow fiber membrane has an outer diameter of 20 to 350 μm and an inner diameter of 14 to 250 μm, the tensile modulus of the composite hollow fiber membrane is from 1,000 to 6,500 MPa, the layer (A) contains a cellulose ester, the thickness of the layer (A) is from 0.01 to 5 μm, and the open pore ratio $H_A$ of the layer (A) and the open pore ratio $H_B$ of the layer (B) satisfy $H_A < H_B$.

9 Claims, No Drawings

COMPOSITE HOLLOW FIBER MEMBRANE AND METHOD FOR PRODUCING SAME

TECHNICAL FIELD

The present invention relates to a composite hollow fiber membrane being excellent in permeation performance and separation performance, having high membrane strength, and capable of easily being produced, and a method for producing the same.

BACKGROUND ART

A hollow fiber membrane is used in a wide range of fields, e.g., a water treatment membrane for producing industrial water or drinking water from seawater, etc., a medical membrane for artificial kidney, plasma separation, etc., a membrane for food-beverage industry such as fruit juice concentration, and a gas separation membrane for separating carbonic acid gas, etc.

As the material of a hollow fiber membrane, in view of, e.g., properties required in respective applications and aptitude for a production method suitable to exhibit the properties, various resin compositions are used. Among others, a cellulose ester has permeation performance due to its hydrophilicity as well as chemical resistance performance of being strong against chlorine bactericides and is therefore widely used as a material of hollow fiber membranes including a water treatment membrane.

For using a cellulose ester as the material to obtain a hollow fiber membrane exhibiting separation performance of removing ions, a phase separation method of solution spinning using a cellulose ester solution containing a large amount of a solvent is known.

For example, Patent Document 1 discloses a hollow fiber membrane having an asymmetric structure, which is produced by mixing N-methyl-2-pyrrolidone, ethylene glycol and benzoic acid with cellulose triacetate, immersing the resulting solution in a solidification bath containing N-methyl-2-pyrrolidone/ethylene glycol/water while discharging it from an arc-type nozzle, and subjecting the obtained membrane to water washing and heat treatment.

Patent Document 2 discloses a composite hollow fiber membrane obtained by forming a thin film that includes a cellulose ester and has an asymmetric structure, on the outer or inner surface of a porous hollow fiber membrane by the phase separation method including immersing the outer or inner side of a porous hollow fiber membrane, such as polyethylene or polysulfone, in a cellulose ester solution containing a large amount of a solvent as well, drying and immersing in water.

On the other hand, an extraction method of obtaining a cellulose ester hollow fiber membrane by simple melt spinning without using a solvent is also known. For example, Patent Document 3 discloses a hollow fiber membrane obtained by mixing a water-soluble polyhydric alcohol having an average molecular weight of 200 to 1,000 with cellulose diacetate, and melt-spinning the resulting solution.

In addition, Patent Document 4 discloses a production method for a composite hollow fiber, in which a mixture of cellulose triacetate, sulfolane and polyethylene glycol as outer layer components, and a mixture of cellulose diacetate and polyethylene glycol as inner layer components are each melted in separate extruders and discharged from a spinneret for two-layer composite hollow fibers.

BACKGROUND ART DOCUMENTS

Patent Documents

Patent Document 1: JP-A-2012-115835
Patent Document 2: JP-A-61-408
Patent Document 3: JP-A-51-70316
Patent Document 4: JP-A-4-65505

SUMMARY OF THE INVENTION

Problems that the Invention is to Solve

The hollow fiber membrane obtained by the technique of Patent Document 1 is not a composite membrane but a single membrane, nevertheless, due to having a dense portion partly in the thickness direction of the membrane, the membrane exhibits separation performance of removing ions. However, since spinning is performed using a stock solution containing a large amount of a solvent, spinning at a high draft ratio or drawing at a high draw ratio is impossible, and the membrane strength is therefore low.

The composite hollow fiber membrane obtained by the technique of Patent Document 2 has separation performance of removing ions but shows very low membrane strength in the thin-film portion having an asymmetric structure and is readily damaged under an external force.

The hollow fiber membrane obtained by the technique described in Patent Document 3 readily causes yarn breakage during production due to poor spinnability. Thus, it has a production problem in that spinning at a high draft ratio and/or drawing at a high draw ratio are impossible, as a result, the membrane strength of the obtained hollow fiber membrane is insufficient, though it is improved compared with solution spinning. In addition, the membrane may have permeation performance but because of a porous membrane produced by an extraction method, does not exhibit separation performance of removing ions at all.

Similarly, in the composite hollow fiber membrane obtained by the technique described in Patent Document 4, spinning at a high draft ratio and/or drawing at a high draw ratio are impossible as well, and the membrane strength of the obtained hollow fiber membrane is insufficient. In addition, the membrane has permeation performance but does not exhibit separation performance of removing ions at all.

As described above, for using a cellulose ester as the material to obtain a hollow fiber membrane exhibiting separation performance of removing ions, only an asymmetric membrane produced by a phase separation method of solution spinning is known, and separation performance of removing ions is not achieved at present by an extraction method of solution spinning.

An object of the present invention is to provide a composite hollow fiber membrane containing a cellulose ester, having separation performance capable of removing ions as well as high permeation performance and high membrane strength, and capable of being easily produced.

Means for Solving the Problems

A composite hollow fiber membrane of the present invention contains at least a layer (A) and a layer (B), in which the composite hollow fiber membrane has an outer diameter of 20 to 350 μm and an inner diameter of 14 to 250 μm, the tensile modulus of the composite hollow fiber membrane is from 1,000 to 6,500 MPa, the layer (A) contains a cellulose ester, the thickness of the layer (A) is from 0.01 to 5 μm, and an open pore ratio $H_A$ of the layer (A) and the open pore ratio $H_B$ of the layer (B) satisfy $H_A < H_B$.

The composite hollow fiber membrane having two or more layers can be manufactured by a method performing at least:

1. a step of heating and thereby melting a resin composition constituting each of the layers of the composite hollow fiber membrane, in which a resin composition constituting at least one of the layers contains a cellulose ester,
2. a step of combining and thereby compounding the melted resin compositions of respective layers within a spinneret having a multi-annular nozzle where a gas channel is arranged in a central part thereof, and
3. a step of either winding the compounded resin composition at a draft ratio of 200 to 1,000 while discharging it into air from the multi-annular nozzle, or spinning out the compounded resin composition at a draft ratio of 10 to 200 to obtain a hollow fiber membrane, drawing the hollow fiber membrane at a ratio of 1.1 to 2.5 times, and subsequently winding the hollow fiber membrane.

Advantage of the Invention

In the cellulose ester-containing composite hollow fiber membrane, the tensile modulus being 1,000 MPa or more means that the degree of orientation of molecular chains of the cellulose ester is high, i.e., the orderliness of molecular chains of the cellulose ester is high, so that high salt rejection performance and high membrane strength can be obtained. In addition, the thickness of a layer with a small open pore ratio is from 0.01 to 5 μm, whereby high water permeability can be realized.

MODE FOR CARRYING OUT THE INVENTION

1. Composite Hollow Fiber Membrane

The composite hollow fiber membrane of this embodiment is a composite hollow fiber membrane including at least a layer (A) and a layer (B), in which the composite hollow fiber membrane has an outer diameter of 20 to 350 μm and an inner diameter of 14 to 250 μm, the tensile modulus of the composite hollow fiber membrane is from 1,000 to 6,500 MPa, the layer (A) contains a cellulose ester, the thickness of the layer (A) is from 0.01 to 5 μm, and the open pore ratio $H_A$ of the layer (A) and the open pore ratio $H_B$ of the layer (B) satisfy $H_A < H_B$.
(1) Resin Composition (a) (Resin Composition Constituting Layer (A))

The layer (A) of the composite hollow fiber membrane of the present invention includes a resin composition (a). The resin composition (a) may contain the following components (1-1) to (1-5).
(1-1) Cellulose Ester The resin composition (a) constituting the layer (A) of the composite hollow fiber membrane contains a cellulose ester. In particular, the resin composition (a) preferably contains a cellulose ester as a main component. The "main component" as used herein refers a component contained in a maximum ratio in terms of weight out of all components of the resin composition (a).

Specific examples of the cellulose ester include cellulose acetate, cellulose propionate, cellulose butyrate, a cellulose-mixed ester in which three hydroxyl groups present in a glucose unit of cellulose are blocked with two or more kinds of acyl groups, and derivatives thereof.

Specific examples of the cellulose-mixed ester include cellulose acetate propionate, cellulose acetate butyrate, cellulose acetate laurate, cellulose acetate oleate, and cellulose acetate stearate.

The weight average molecular weight (Mw) of the cellulose ester is preferably from 50,000 to 250,000. When Mw is 50,000 or more, thermal decomposition of the cellulose ester during melting is suppressed, and the membrane strength of the composite hollow fiber membrane can reach a practical level. When Mw is 250,000 or less, the melt viscosity does not become excessively high and stable melt spinning is therefore made possible.

Mw is more preferably from 60,000 to 220,000, still more preferably from 80,000 to 200,000. The weight average molecular weight (Mw) is a value calculated by GPC measurement. The calculation method thereof is described in detail in Examples.

Each of cellulose-mixed esters exemplified has an acetyl group and another acyl group (e.g., propionyl group, butyryl group, lauryl group, oleyl group, stearyl group). In the cellulose-mixed ester contained in the resin composition (a), the average degrees of substitution of an acetyl group and another acyl group preferably satisfy the following formulae.

1.0≤(average degree of substitution of acetyl group+ average degree of substitution of another acyl group)≤3.0

0.1≤(average degree of substitution of acetyl group)≤2.6

0.1≤(average degree of substitution of another acyl group)≤2.6

When the formulae above are satisfied, a composite hollow fiber membrane achieving both separation performance and permeation performance is realized. Furthermore, when the formulae above are satisfied, good thermal flowability is realized at the time of melting the resin composition (a) in the production of a composite hollow fiber membrane. Here, the average degree of substitution refers the number of hydroxyl groups to which an acyl group (acetyl group+another acyl group) is chemically bonded, out of three hydroxyl groups present per glucose unit of the cellulose.

The resin composition (a) may contain only one kind of a cellulose ester or may contain two or more kinds of cellulose esters.

The resin composition (a) is preferably at least one compound selected from the group consisting of, out of the cellulose esters recited above as specific examples, cellulose acetate propionate and cellulose acetate butyrate. By containing such a cellulose ester, a composite hollow fiber membrane having high separation performance and high permeation performance is realized.

The content of the cellulose ester in the resin composition (a) is preferably from 70 to 100 wt %, more preferably from 80 to 100 wt %, still more preferably from 90 to 100 wt %, when the entirety of the resin composition (a) is taken as 100 wt %.
(1-2) Plasticizer for Cellulose Ester The resin composition (a) constituting the layer (A) of the composite hollow fiber membrane of the present invention may contain a plasticizer for the cellulose ester.

The plasticizer for the cellulose ester is not particularly limited as long as it is a compound capable of thermoplasticizing the cellulose ester. In addition, not only one kind of a plasticizer but also a combination of two or more kinds of plasticizers may be used.

Specific examples of the plasticizer for the cellulose ester include a polyalkylene glycol-based compound such as polyethylene glycol and polyethylene glycol fatty acid ester, a glycerin-based compound such as glycerin fatty acid ester and diglycerin fatty acid ester, a citric acid ester-based compound, a phosphoric acid ester-based compound, and a fatty acid-based ester compound such as an adipic acid ester, a caprolactone-based compound and derivatives thereof.

Among these, a polyalkylene glycol has good compatibility with the cellulose ester and is therefore preferred in that a plasticizing effect is brought by addition in a small amount to suppress reduction in the membrane strength and in that pores after elution become fine, making it possible to achieve both separation performance and permeation performance.

Specific preferable examples of the polyalkylene glycol-based compound include polyethylene glycol, polypropylene glycol, and polybutylene glycol, each having a weight average molecular weight of 400 to 4,000.

The content of the plasticizer for the cellulose ester at the time of heating and thereby melting the resin composition (a) is preferably from 5 to 30 wt %, when the entirety of the components constituting the resin composition (a) before heating is taken as 100 wt %.

When the content is 5 wt % or more, thermoplasticity of the cellulose ester and permeation performance of the composite hollow fiber membrane are improved. When the content is 30 wt % or less, separation performance and membrane strength of the composite hollow fiber membrane are improved. The content of the plasticizer for the cellulose ester is more preferably from 10 to 25 wt %, still more preferably from 15 to 20 wt %.

After the layer (A) of the composite hollow fiber membrane is formed by melting the resin composition (a), the plasticizer for the cellulose ester may remain in the layer (A) or may be eluted from the layer (A). In the case where the plasticizer is eluted, traces left after escape of the plasticizer may become fine pores in the membrane, as a result, permeation performance is improved.

(1-3) Antioxidant

The resin composition (a) constituting the layer (A) of the composite hollow fiber membrane preferably contains an antioxidant.

As for specific examples of the antioxidant, it is preferable to contain a phosphorus-based antioxidant, and a pentaerythritol-based compound is more preferred. The pentaerythritol-based compound includes, specifically, bis (2,6-di-tert-butyl-4-methylphenyl) pentaerythritol diphosphite, etc. In the case of containing an antioxidant, thermal decomposition during melting is suppressed, and this makes it possible to improve the membrane strength and prevent the membrane from coloring.

The content of the antioxidant is preferably from 0.005 to 0.500 wt %, when the entirety of the components constituting the resin composition (a) before heating is taken as 100 wt %.

(1-4) Hydrophilic Resin

The resin composition (a) constituting the layer (A) of the composite hollow fiber membrane may contain a hydrophilic resin. In the case of containing a hydrophilic resin, the permeation performance can be enhanced particularly when using the membrane for water treatment.

The "hydrophilic resin" as used in the present invention means a resin having high affinity for water and indicates a resin that dissolves in water or has a smaller contact angle with water than that of the cellulose ester.

Specific examples of the hydrophilic resin are not particularly limited as long as it is a resin having the above-described property, but preferred examples thereof include a polyalkylene glycol, polyvinylpyrrolidone, polyvinyl alcohol, and a derivative thereof.

Among these, a polyalkylene glycol is preferred, and specific examples thereof include polyethylene glycol, polypropylene glycol, and polybutylene glycol, each having a weight average molecular weight (Mw) of 4,000 to 1,000, 000.

The content of the hydrophilic resin at the time of heating and thereby melting the resin composition (a) is preferably from 0.1 to 10 wt %, when the entirety of the components constituting the resin composition (a) before heating is taken as 100 wt %.

When the content of the hydrophilic resin is 0.1 wt % or more, permeation performance of the composite hollow fiber membrane is improved. When the content of the hydrophilic resin is 10 wt % or less, separation performance and membrane strength of the separation membrane are improved. The content of the hydrophilic resin is more preferably from 1 to 9 wt %, still more preferably from 2 to 8 wt %.

After the layer (A) of the composite hollow fiber membrane is formed by melting the resin composition (a), the hydrophilic resin preferably remains in the layer (A) but may be eluted, in part or in whole, from the layer (A). In the case where the hydrophilic resin is eluted, traces left after escape of the hydrophilic resin may become fine pores in the membrane, as a result, permeation performance is improved.

(1-5) Additives

The resin composition (a) constituting the layer (A) of the composite hollow fiber membrane may contain an additive other than those described in (1-1) to (1-4), to the extent not impairing the effects of the present invention.

Specific examples of the additive include a resin, such as polyamide, polyester, cellulose ether, polyacrylonitrile, polyolefin, polyvinyl compound, polycarbonate, poly(meth) acrylate, polysulfone and polyethersulfone, an organic lubricant, a crystal nucleating agent, an organic particle, an inorganic particle, a terminal blocking agent, a chain extender, an ultraviolet absorber, an infrared absorber, a coloration preventing agent, a delustering agent, an antimicrobial agent, an electrification controlling agent, a deodorant, a flame retardant, a weather-resistant agent, an antistatic agent, an antioxidant, an ion-exchanging agent, an antifoaming agent, a color pigment, a fluorescent whitening agent, and a dye.

(2) Resin Composition (b) (resin composition constituting layer (B))

The layer (B) of the composite hollow fiber membrane includes a resin composition (b). The resin composition (b) may contain the following components (2-1) to (2-5).

(2-1) Cellulose Ester

The resin composition (b) constituting the layer (B) of the composite hollow fiber membrane preferably contains a cellulose ester. In the case of incorporating a cellulose ester into the resin composition (b), the layer (B) exhibits excellent adhesion to the layer (A). The resin composition (b) more preferably contains the same cellulose ester as that in the resin composition (a).

Specific examples of the cellulose ester that can be incorporated into the resin composition (b) are the same as those described in the paragraph of (1-1).

The preferable range of the weight average molecular weight of the cellulose ester that can be incorporated into the resin composition (b) is the same as that described in the paragraph of (1-1).

In the cellulose-mixed ester contained in the resin composition (b), the average degrees of substitution of an acetyl group and another acyl group preferably satisfy the following formulae.

1.0≤(average degree of substitution of acetyl group+ average degree of substitution of another acyl group)≤3.0

0.1≤(average degree of substitution of acetyl group)≤2.6

0.1≤(average degree of substitution of another acyl group)≤2.6

When the formulae above are satisfied, the layer (B) exhibits good adhesion to the layer (A). Furthermore, when the formulae above are satisfied, good thermal flowability is realized at the time of melting the resin composition (b) in the production of a composite hollow fiber membrane.

The resin composition (b) may contain only one kind of a cellulose ester or may contain two or more kinds of cellulose esters.

The resin composition (b) is preferably at least one compound selected from the group consisting of, out of the cellulose esters recited above as specific examples, cellulose acetate propionate and cellulose acetate butyrate.

The content of the cellulose ester in the resin composition (b) is preferably from 40 to 100 wt %, more preferably from 60 to 100 wt %, still more preferably from 80 to 100 wt %, when the entirety of the resin composition (b) is taken as 100 wt %.

(2-2) Plasticizer for Cellulose Ester

The resin composition (b) constituting the layer (B) of the composite hollow fiber membrane may contain a plasticizer for the cellulose ester.

The plasticizer for the cellulose ester is not particularly limited as long as it is a compound capable of thermoplasticizing the cellulose ester. In addition, not only one kind of a plasticizer but also a combination of two or more kinds of plasticizers may be used.

Specific examples of the plasticizer for the cellulose ester are the same as those described in the paragraph of (1-2).

The content of the plasticizer for the cellulose ester at the time of heating and thereby melting the resin composition (b) is preferably from 15 to 50 wt %, when the entirety of the components constituting the resin composition (b) before heating is taken as 100 wt %. When the content is 15 wt % or more, thermoplasticity of the cellulose ester and permeation performance of the composite hollow fiber membrane are improved. When the content is 50 wt % or less, membrane strength of the composite hollow fiber membrane is improved. The content of the plasticizer for the cellulose ester is more preferably from 15 to 45 wt %, still more preferably from 15 to 40 wt %.

After the layer (B) of the composite hollow fiber membrane is formed by melting the resin composition (b), the plasticizer for the cellulose ester may remain in the layer (B) or may be eluted from the layer (B). In the case where the plasticizer is eluted, traces left after escape of the plasticizer become fine pores in the membrane, and permeation performance is thereby improved.

(2-3) Antioxidant

The resin composition (b) constituting the layer (B) of the composite hollow fiber membrane preferably contains an antioxidant.

Specific examples of the antioxidant are the same as those described above in the paragraph of (1-3).

In the case of containing an antioxidant, thermal decomposition at the time of melting by heating is suppressed, and this makes it possible to improve the membrane strength and prevent the membrane from coloring.

The content of the antioxidant is preferably from 0.005 to 0.500 wt %, when the entirety of the components constituting the resin composition (b) before heating is taken as 100 wt %.

(2-4) Hydrophilic Resin

The resin composition (b) constituting the layer (B) of the composite hollow fiber membrane may contain a hydrophilic resin. In the case of containing a hydrophilic resin, the permeation performance can be enhanced particularly when using the membrane for water treatment.

Specific examples of the hydrophilic resin are the same as those described above in the paragraph of (1-4).

The content of the hydrophilic resin at the time of heating and thereby melting the resin composition (b) is preferably from 5 to 50 wt %, when the entirety of the components constituting the resin composition (b) before heating is taken as 100 wt %.

When the content of the hydrophilic resin is 5 wt % or more, permeation performance of the composite hollow fiber membrane is improved. When the content of the hydrophilic resin is 50 wt % or less, membrane strength of the separation membrane is improved. The content of the hydrophilic resin is more preferably from 8 to 45 wt %, still more preferably from 10 to 40 wt %.

After the layer (B) of the composite hollow fiber membrane is formed by melting the resin composition (b), the hydrophilic resin may remain in the layer (B) or may be eluted, in part or in whole, from the layer (B). In the case where the hydrophilic resin is eluted, traces left after escape of the hydrophilic resin become fine pores in the membrane, and permeation performance is thereby improved.

(2-5) Additives

The resin composition (b) constituting the layer (B) of the composite hollow fiber membrane may contain an additive other than those described in (2-1) to (2-4), to the extent not impairing the effects of the present invention.

Specific examples of the additive are the same as those described above in the paragraph of (1-5).

(3) Layer Configuration of Membrane

The composite hollow fiber membrane of the present invention includes at least two resin layers.

One of the two resin layers is the above-described layer (A), and another is the above-described layer (B).

The composite hollow fiber membrane may be composed of two layers of layer (A) and layer (B), or as long as at least these two layers are contained, the membrane may be composed of three or more layers containing another layer.

In the case where the composite hollow fiber membrane is composed of two layers of layer (A) and layer (B), either layer may be an outer layer, but the layer (A) is preferably an outer layer.

In addition, also in the case where the composite hollow fiber membrane is composed of three or more layers, the order of stacking the layers is not particularly limited, but the layer (A) is preferably an outermost layer.

In the case where the hollow fiber membrane has a plurality of layers having the same composition and different open pore ratio from each other, these layers are recognized as separate layers, and the hollow fiber membrane comes under the configuration of "including a layer (A) and a layer (B)".

(4) Cross-Section Structure of Membrane

In the layer (A) and layer (B) of the composite hollow fiber membrane of the present invention, the cross-section structure in the thickness direction is preferably homogeneous. The "cross-section in the thickness direction" as used herein indicates cross-sections in a direction (radial direction) perpendicular to the machine direction (longitudinal direction) during production of the hollow fiber membrane and in the thickness direction of the membrane.

In addition, the "cross-section structure is homogeneous" as used herein means a state that when the above-described cross-section in the thickness direction of the membrane is continuously observed from one surface side toward the other surface side of the membrane by a scanning electron microscope at a magnification of 10,000 times, a structural change is not confirmed. Here, a strain, etc. in the cross-section structure, which is affected by the surface profile of the membrane, are not regarded as a structural change.

For example, in a membrane produced by so-called melt spinning of discharging a solvent-free resin composition that is heated and thereby melted, from a spinneret and then cooling and solidifying the melt in air, or in a membrane produced by discharging a solution in which a resin composition is dissolved in a solvent from a spinneret, then solidifying the solution evenly in the thickness direction, and extracting the solvent in the solution evenly in the thickness direction, the above-described structural change cannot be confirmed, and such a membrane is a membrane in which the cross-section structure is homogeneous.

Here, even if a structure in which pores differing in the size, or spherical, columnar or net-like resin compositions differing in the size or thickness are regularly or irregularly present is observed, as long as the average value of the size or thickness is not on the increase or decrease when continuously observed from one surface side toward the other surface side of the membrane, this is in the present invention regarded as a membrane in which the cross-section structure is homogenous.

On the other hand, in the case of discharging a solution in which a resin composition is dissolved in a solvent from a spinneret and then solidifying the solution unevenly in the thickness direction, for example, in the case of rapidly solidifying both surfaces or one surface and slowly solidifying the inside, extraction of the solvent in the solution tends to become uneven in the thickness direction. Consequently, a structural change is confirmed in the thickness direction of the membrane, and a membrane having a heterogeneous cross-section structure is likely to be formed. A membrane generally called an asymmetric membrane having a dense separation functional layer partially in the thickness direction of the membrane, produced by a nonsolvent phase separation method, a heat-induced phase separation method, etc., is a membrane in which the cross-section structure is heterogeneous.

(5) Cross-Sectional Shape of Membrane

The outer diameter of the composite hollow fiber membrane of the present invention is from 20 to 350 μm. If the outer diameter is less than 20 μm, permeation performance is degraded due to pressure loss of a fluid flowing in the hollow part. If the outer diameter exceeds 350 μm, the permeation flow rate per module becomes insufficient due to decrease in the membrane area per unit volume.

The outer diameter of the composite hollow fiber membrane of the present invention is preferably 30 μm or more, more preferably 40 μm or more, still more preferably 50 μm or more, yet still more preferably 60 μm or more. In addition, the outer diameter of the composite hollow fiber membrane of the present invention is preferably 250 μm or less, more preferably 150 μm or less, still more preferably 120 μm or less, yet still more preferably 95 μm or less.

The inner diameter of the composite hollow fiber membrane of the present invention is from 14 to 250 μm. If the inner diameter is less than 14 μm, permeation performance is degraded due to pressure loss of a fluid flowing through the hollow part. If the inner diameter exceeds 250 μm, the permeation flow rate per module becomes insufficient due to decrease in the membrane area per unit volume.

The inner diameter of the composite hollow fiber membrane of the present invention is preferably 22 μm or more, more preferably 28 μm or more, still more preferably 36 μm or more, yet still more preferably 42 μm or more. In addition, the inner diameter of the composite hollow fiber membrane of the present invention is preferably 180 μm or less, more preferably 108 μm or less, still more preferably 84 μm or less, yet still more preferably 68 μm or less.

The membrane thickness of the entire composite hollow fiber membrane of the present invention is preferably from 3 to 60 μm. When the membrane thickness is 3 μm or more, the hollow fiber membrane can withstand buckling in the radial direction, and when the membrane thickness is 60 μm or less, permeation performance is improved. The membrane thickness is more preferably from 5 to 50 μm, still more preferably from 7 to 40 μm, yet still more preferably from 8 to 30 μm.

In the composite hollow fiber membrane of the present invention, the thickness of the layer (A) in the membrane thickness of the entire composite hollow fiber membrane is from 0.01 to 5 μm. If the thickness of the layer (A) is less than 0.01 μm, separation performance is degraded, and if the thickness exceeds 5 μm, permeation performance deteriorates.

The thickness of the layer (A) is preferably 0.05 μm or more, more preferably 0.1 μm or more, still more preferably 0.3 μm or more, yet still more preferably 0.5 μm or more. In addition, the thickness of the layer (A) is preferably 4 μm or less, more preferably 3 μm or less, still more preferably 2 μm or less, yet still more preferably 1 μm or less.

The thickness of the layer (B) is preferably 3 μm or more, more preferably 5 μm or more, still more preferably 7 μm or more, yet still more preferably 8 μm or more. In addition, the thickness of the layer (B) is preferably 60 μm or less, more preferably 50 μm or less, still more preferably 40 μm or less, yet still more preferably 30 μm or less.

The percentage of hollowness of the composite hollow fiber membrane of the present invention is, in view of relationship between the pressure loss of a fluid flowing through the hollow part and the buckling pressure, preferably from 20 to 55%, more preferably from 25 to 50%, still more preferably from 30 to 45%.

The method for adjusting the outer and inner diameters of the composite hollow fiber membrane, the membrane thickness of the entire composite hollow fiber membrane, and the percentage of hollowness to the ranges above is not particularly limited, but these can be adjusted, for example, by changing the shape of a discharge hole of the spinneret or changing the draft ratio at the time of production of the composite hollow fiber membrane.

The method for adjusting the thickness ratio of the layer (A) and the layer (B) is not particularly limited as well, but the thickness ratio can be adjusted, for example, by changing the geometry of the flow channel gap between resin compositions constituting respective layers within the spinneret, or changing the discharge rate of the resin composition constituting each layer from an extruder by means of a gear pump, etc.

Above all, in the present invention, each of the layer (A) and the layer (B) includes the above-described preferable kind and amount of resin composition and the later-described preferable production method is employed, the thickness of the layer (A) which greatly contributes to permeation performance and separation performance of the membrane can be made within the range above, and the permeation performance and the separation performance can thereby be successfully balanced at a high level.

(6) Open Pore Ratio

When the open pore ratio of the layer (A) is defined as $H_A$ and the open pore ratio of the layer (B) is defined as $H_B$, the composite hollow fiber membrane of the present invention preferably satisfies the following relational expression:

$$H_A < H_B$$

By satisfying this relational expression, both the permeation performance and the separation performance can be achieved. The measurement conditions of the open pore ratio are described in detail in Examples.

The open pore ratio $H_A$ of the layer (A) is preferably from 0 to 10%, more preferably from 0 to 8%, still more preferably from 0 to 5%. When the open pore ratio $H_A$ of the layer (A) is set in the range above, both the permeation performance and the separation performance can be achieved.

The open pore ratio $H_B$ of the layer (B) is preferably from 5 to 55%, more preferably from 5 to 45%, still more preferably from 5 to 35%, yet still more preferably from 10 to 30%, even yet still more preferably from 15 to 25%. When the open pore ratio $H_B$ of the layer (B) is set in the range above, the permeation performance is improved.

The method for adjusting the open pore ratios of the layer (A) and the layer (B) is not particularly limited but includes, for example, a method of forming fine pores by eluting the plasticizer and/or the hydrophilic resin from each layer of the composite hollow fiber membrane which was spun by using a resin composition containing the above-described preferable kind and amount of plasticizer and/or hydrophilic resin.

(7) Pore Structure of Layer (B)

The layer (B) of the composite hollow fiber membrane of the present invention preferably has a continuous pore, because good permeation performance is exhibited. The continuous pore is a continuously penetrating pore, and in the present invention, a continuous pore is defined as a pore having a length of 5 times or more the pore diameter.

The pore diameter of the layer (B) is preferably from 0.001 to 1 μm, more preferably from 0.005 to 0.5 μm, still more preferably from 0.01 to 0.1 μm. The method for measuring the pore diameter is described in detail in Examples.

The method for forming a continuous pore in the layer (B) is not particularly limited and includes, for example, a method of applying heating and/or drawing during melt spinning or after spinning to cause phase separation into a cellulose ester and a plasticizer and/or a hydrophilic resin, and then eluting the plasticizer and/or the hydrophilic resin. In addition, for example, a method of applying heating and/or drawing to connect island components in a sea-island structure including the cellulose ester as the sea and the plasticizer and/or hydrophilic resin as the island may be conducted.

(8) Membrane Permeation Flux

In the composite hollow fiber membrane of the present invention, in order to bring out good permeation performance particularly when using the membrane for water treatment, the membrane permeation flux at the time of filtrating an aqueous solution with a sodium chloride concentration of 500 mg/l at 25° C. and a pressure of 0.5 MPa is preferably 5 L/m²/day or more. The method for measuring the membrane permeation flux is described in detail in Examples.

The membrane permeation flux is more preferably 10 L/m²/day or more, still more preferably 20 L/m²/day or more, yet still more preferably 30 L/m²/day or more, even yet still more preferably 50 L/m²/day or more. The higher membrane permeation flux is preferable, but in view of balance with the salt rejection ratio, the upper limit is 500 L/m²/day.

(9) Salt Rejection Ratio

In the composite hollow fiber membrane of the present invention, in order to bring out good separation performance particularly when using the membrane for water treatment, the salt rejection ratio at the time of filtrating an aqueous solution with a sodium chloride concentration of 500 mg/l at 25° C. and a pressure of 0.5 MPa is preferably from 90.0 to 99.9%. The method for measuring the salt rejection ratio is described in detail in Examples.

The salt rejection ratio is more preferably 95.0% or more, still more preferably 96.0% or more, yet still more preferably 97.0% or more, even yet still more preferably 98.0% or more. In addition, the salt rejection ratio is preferably 99.8% or less, more preferably 99.7% or less.

Conventionally, there is no technical knowledge that the salt rejection ratio is increased by high tensile modulus of a hollow fiber membrane. Furthermore, there is also no technical knowledge that a membrane capable of removing ions can be produced by melt spinning.

In the present invention, first, it has been discovered that when a hollow fiber membrane includes the above-described preferable kind and amount of resin composition, permeation performance and salt rejection performance can be developed not only by solution spinning but also by melt spinning. Next, ion removal is rendered possible by achieving improvement of the salt rejection ratio by virtue of high tensile modulus that can be achieved by melt spinning. Furthermore, the layer (A) greatly contributing to separation performance of the membrane is compounded with the layer (B), and it has been found that the draft or drawing ratio at the time of melt spinning can thereby be set high and consequently, cellulose ester molecular chains in the layer (A) can be highly oriented. As a result, it becomes possible to develop very high salt rejection ratio.

(10) Tensile Modulus

In the composite hollow fiber membrane of the present invention, the tensile modulus in the longitudinal direction (axial direction) is from 1,000 to 6,500 MPa. The measurement conditions of the tensile modulus are described in detail in Examples.

The characteristics of the present invention reside in the knowledge that high salt rejection performance is developed when the tensile modulus in the longitudinal direction is set to be 1,000 MPa or more, which cannot be anticipated by the conventional technology. The reason why the salt rejection performance is developed is not clearly known but is presumed as follows.

In the cellulose ester-containing hollow fiber membrane, the tensile modulus in the longitudinal direction being 1,000 MPa or more, means that the degree of orientation of molecular chains of the cellulose ester is high, i.e., the orderliness of molecular chains of the cellulose ester is high, as a result, high salt rejection performance can be obtained.

In addition, the tensile modulus in the longitudinal direction is 6,500 MPa or less, and flexibility suitable for incorporation of a separation membrane into a membrane module is thereby realized. The method for adjusting the tensile modulus to the range of 1,000 to 6,500 MPa is not particularly limited but includes a method of setting the draft ratio during melt spinning and/or the drawing heat setting conditions to respective preferable conditions described later.

The tensile modulus is preferably 1,500 MPa or more, more preferably 2,000 MPa or more, still more preferably 2,200 MPa or more. In addition, the tensile modulus is preferably 6,000 MPa or less, more preferably 5,500 MPa or less, still more preferably 5,000 MPa or less.

(11) Stress at 5% Elongation

In the composite hollow fiber membrane of the present invention, the stress at 5% elongation in the longitudinal direction (axial direction) is preferably 30 MPa or more. The measurement conditions of the stress at 5% elongation are described in detail in Examples.

In the cellulose ester-containing composite hollow fiber membrane, the stress at 5% elongation being 30 MPa or more, means that the degree of orientation of molecular chains of the cellulose ester is high, i.e., the orderliness of molecular chains of the cellulose ester is high, as a result, high salt rejection performance can be obtained.

The method for adjusting the stress at 5% elongation in the longitudinal direction to 30 MPa or more is not particularly limited but includes a method of setting the draft ratio during spinning and/or the drawing conditions at the time of drawing to respective preferable ranges described later. The stress at 5% elongation in the longitudinal direction is preferably 40 MPa or more, more preferably 60 MPa or more, still more preferably 80 MPa or more. In view of balance with the elongation, the stress at 5% elongation in the longitudinal direction is preferably 300 MPa or less.

(12) Tensile Strength

In the composite hollow fiber membrane of the present invention, in order to develop membrane strength against tension in the longitudinal direction (axial direction), the tensile strength is preferably 80 MPa or more. The measurement conditions of the tensile strength are described in detail in Examples. The tensile strength is more preferably 90 MPa or more, still more preferably 100 MPa or more, yet still more preferably 120 MPa. The higher tensile strength is preferable, but in view of balance with the elongation, it is preferably 300 MPa or less.

(13) Kind of Membrane

The composite hollow fiber membrane of the present invention is a membrane usable particularly for water treatment. Specifically, the water treatment membrane includes a microfiltration membrane, an ultrafiltration membrane, a nanofiltration membrane, a reverse osmosis membrane, a forward osmosis membrane, etc. Among others, the present invention is preferably applied to a nanofiltration membrane, a reverse osmosis membrane and a forward osmosis membrane.

(14) Production Method

The method for producing the composite hollow fiber membrane having two or more layers of the present invention is specifically described below, but the present invention should not be construed as limited thereto.

The method for producing the composite hollow fiber membrane having two or more layers of the present invention includes steps of heating and thereby melting a resin composition constituting each layer, combining resin compositions within a spinneret, and forming the combined resin composition into a hollow fiber by the melt spinning method.

Specifically, the present production method includes:
1. a step of heating and thereby melting a resin composition constituting each layer of the composite hollow fiber membrane, in which a resin composition constituting at least one layer contains a cellulose ester,
2. a step of combining and thereby compounding the melted resin compositions of respective layers within a spinneret having a multi-annular nozzle where a gas channel is arranged in a central part thereof, and
3. a step of either winding the compounded resin composition at a draft ratio of 200 to 1,000 while discharging it into air from the multi-annular nozzle, or spinning out the compounded resin composition at a draft ratio of 10 to 200 to obtain a hollow fiber membrane, drawing the hollow fiber membrane at a ratio of 1.1 to 2.5 times, and subsequently winding the hollow fiber membrane.

In producing a resin composition constituting each layer of the composite hollow fiber membrane of the present invention, a method of melting and kneading respective components is employed. The apparatus used is not particularly limited, and a known mixing machine such as kneader, roll mill, Banbury mixer, single-screw or twin-screw extruder may be used. Among others, from the viewpoint of ensuring good dispersibility of the plasticizer or hydrophilic resin, a twin-screw extruder is preferably used. From the viewpoint that a volatile matter such as water and low molecular material can be removed, use of a twin-screw extruder with a vent is more preferred.

The obtained resin composition may be once pelletized, again melted and used for melt spinning or may be introduced directly into a spinneret and used for melt spinning. At the time of once pelletizing the resin composition, the pellet is dried to adjust a water content to 200 ppm (on the weight basis) or less and the resulting resin composition is preferably used.

The resin compositions of respective layers, which are melted by the method above, are combined and thereby compounded within a spinneret having a multi-annular nozzle where a gas channel is arranged in the central part thereof. At this time, the geometry of the flow channel gap between resin compositions constituting respective layers within the spinneret is appropriately changed according to the melt viscosity of the resin composition and the desired cross-sectional shape of the composite hollow fiber membrane produced. In addition, the discharge rate of the resin composition constituting each layer from the spinneret is appropriately changed according to the desired cross-sectional shape of the produced composite hollow fiber membrane, for example, by the rotation speed of a gear pump.

Subsequently, the compounded resin composition is discharged into air from the spinneret having a multi-annular nozzle. Here, the distance L from the lower surface of the spinneret to the upper end of a cooling apparatus (chimney) is preferably from 0 to 50 mm. At the time of cooling the hollow fiber membrane discharged from the spinneret, the temperature of the cooling air of the cooling apparatus (chimney) is preferably from 5 to 25° C. In addition, the air speed of the cooling air is preferably from 0.8 to 2.0 m/sec.

The hollow fiber membrane cooled by the cooling apparatus is wound by a winder. The draft ratio that can be calculated by winding rate/discharge rate is from 10 to 1,000. In the case of not passing through a step of thereafter drawing the membrane, the draft ratio is preferably 200 or more, more preferably 300 or more, still more preferably 400 or more. In the case of passing through a step of drawing the membrane, the draft ratio is preferably 200 or less, more preferably 150 or less, still more preferably 100 or less.

The composite hollow fiber membrane spun by the method above may further pass through a step of drawing the membrane. Passing through a drawing step makes it possible to further enhance the orientation of cellulose molecular chains and is therefore preferred from the viewpoint of improving the salt rejection ratio. The drawing method is not particularly limited but may be, for example, a method where the composite hollow fiber membrane before drawing is transferred on a heated roll, thereby raising the temperature to a temperature at which drawing is performed, and drawn utilizing a peripheral speed difference between rolls, or may be a method where the membrane is transferred in a dry heat oven or a heated liquid such as hot water, thereby raising the temperature to a temperature at which drawing is performed, and drawn utilizing a peripheral speed difference between rolls. The drawing may be performed in a single stage or in multiple stages of two or more stages.

The temperature of the composite hollow fiber membrane in the drawing step is preferably from 40 to 180° C., more preferably from 60 to 160° C., still more preferably from 80 to 140° C. The total draw ratio is preferably 1.1 times or more, more preferably 1.3 times or more, still more preferably 1.5 times or more. In addition, the total draw ratio is preferably 2.5 times or less, more preferably 2.2 times or less, still more preferably 2.0 times or less. Furthermore, if desired, heat setting may be applied during or after drawing. The heat setting temperature is preferably from 80 to 180° C.

The thus-obtained composite hollow fiber membrane may be used as it is, but the membrane surface is preferably hydrophilized before use, for example, with an alcohol-containing aqueous solution or an aqueous alkali solution.
(15) Module The composite hollow fiber membrane of the present invention obtained as above may be incorporated as a hollow fiber membrane module by a conventionally known method.

EXAMPLES

The present invention is more specifically described below by referring to Examples, but the present invention should not be construed as limited thereto in any way.
[Measurement and Evaluation Methods]

The present invention is more specifically described below by referring to Examples. Respective characteristic values in Examples were determined by the following methods. The present invention is not limited to these Examples. In (3) to (7) and (10) to (12) below, the separation membrane was measured and evaluated in the state of being vacuum-dried at 25° C. for 8 hours.
(1) Average Degree of Substitution for Cellulose-Mixed Ester The method for calculating the average degree of substitution for a cellulose-mixed ester in which an acetyl group and an acyl group are bonded to cellulose is as follows.

0.9 g of a cellulose-mixed ester dried at 80° C. for 8 hours was weighed and dissolved by adding 35 ml of acetone and 15 ml of dimethylsulfoxide and thereafter, 50 ml of acetone was further added. The resulting solution was saponified for 2 hours by adding 30 ml of an aqueous 0.5 N-sodium hydroxide solution with stirring. After adding 50 ml of hot water to wash the side surface of flask, titration was performed with 0.5 N-sulfuric acid by using phenolphthalein as an indicator. Separately, a blank test was performed by the same method as that for the sample. A supernatant of the solution after the completion of titration was diluted to 100 times, and the compositions of organic acids were measured using an ion chromatograph. From the measurement results and the results of acid composition analysis by ion chromatograph, the degrees of substitution were calculated according to the following formulae.

$$TA=(B-A)\times F/(1000\times W)$$

$$DSace=(162.14\times TA)/[\{1-(Mwace-(16.00+1.01))\times TA\}+\{1-(Mwacy-(16.00+1.01))\times TA\}\times (Acy/Ace)]$$

$$DSacy=DSace\times (Acy/Ace)$$

TA: Total organic acid amount (ml)
A: Sample titration amount (ml)
B: Blank test titration amount (ml)
F: Titer of sulfuric acid
W: Sample weight (g)
DSace: Average degree of substitution of acetyl group
DSacy: Average degree of substitution of another acyl group
Mwace: Molecular weight of acetic acid
Mwacy: Molecular weight of another organic acid
Acy/Ace: Molar ratio of acetic acid (Ace) and another organic acid (Acy)
162.14: Molecular weight of repeating unit of cellulose
16.00: Atomic weight of oxygen
1.01: Atomic weight of hydrogen
(2) Weight Average Molecular Weight (Mw) of Cellulose Ester The sample for GPC measurement was prepared by completely dissolving a cellulose ester in tetrahydrofuran at a concentration of 0.15 wt %. Using this sample, GPC measurement was performed by Waters 2690 under the following conditions to determine the weight average molecular weight (Mw) in terms of polystyrene.

Column: TSK gel GMHHR-H, manufactured by Tosoh Corp., two columns connected
Detector: Waters 2410, differential refractometer RI
Solvent for mobile phase: Tetrahydrofuran
Flow speed: 1.0 ml/min
Injection amount: 200 μl
(3) Outer Diameter (μm) of Composite Hollow Fiber Membrane Cross-sections in a direction (radial direction) perpendicular to the longitudinal direction of the composite hollow fiber membrane and in the thickness direction of the membrane were observed and photographed by an optical microscope, and the outer diameter (μm) of the composite hollow fiber membrane was calculated. Here, as for the outer diameter of the composite hollow fiber membrane, the outer diameter was calculated using 10 composite hollow fiber membranes, and the average value thereof was employed.
(4) Inner Diameter (μm) of Composite Hollow Fiber Membrane Cross-sections in a direction (radial direction) perpendicular to the longitudinal direction of a composite hollow fiber membrane and in the thickness direction of the membrane were observed and photographed by an optical microscope, and the inner diameter (μm) of the composite hollow fiber membrane was calculated. Here, as for the inner diameter of the composite hollow fiber membrane, the inner diameter was calculated using 10 composite hollow fiber membranes, and the average value thereof was employed.

(5) Thickness (μm) of Layer (A)

The composite hollow fiber membrane was cooled in liquid nitrogen and fractured in a direction (radial direction) perpendicular to the longitudinal direction and in the thickness direction of the membrane by applying a stress. The cross-sections thereof were observed and photographed by a scanning electron microscope, and the thickness (μm) of the layer (A) was calculated. Here, as for the thickness of the layer (A), the thickness was calculated by observing arbitrary 10 points, and the average value thereof was employed.

(6) Open Pore Ratios $H_A$ and $H_B$ (%)

The surface (outer surface or inner surface) or cross-section of each of the layer (A) and the layer (B) of the composite hollow fiber membrane was observed and photographed at a magnification of 30,000 times by a scanning electron microscope, a transparent film or sheet was overlaid on the obtained photograph, and the portion corresponding to a fine pore was filled with oil-based ink, etc. The area of the region corresponding to a fine pore was then determined using an image analyzer. This measurement was performed on arbitrary 30 fine pores, and the average pore area S (m$^2$) was calculated by number-averaging the measured areas. Subsequently, the number of fine pores per 3 μm square in the photograph where the average pore area S was calculated, was counted and converted to the number of fine pores per 1 m$^2$, and the fine pore density (pores/m$^2$) was thereby calculated. The open pore ratio was calculated and determined from the obtained average pore area S and fine pore density according to the following formula. Here, for the calculation of the open pore ratio, fine pores having a fine pore diameter (in the case of an elliptic or bar-like shape, a short diameter) of 1 nm or more are used.

$$\text{Open pore ratio (\%)} = (\text{average pore area } S) \times (\text{fine pore density}) \times 100$$

Incidentally, in the case where the surfaces of the layer (A) and the layer (B) are exposed and can be observed, fine pores in the surface are observed in principle. However, in the case where the surfaces are not exposed or where the diameter of the hollow fiber membrane is small and the inner surface cannot be observed, the cross-section is observed. In both cases, the observation surface of the layer (A) should be matched with that of the layer (B). The cross-section was prepared by the same method as that described in (5), and observation of the cross-section was performed in the central part in the thickness direction of each layer. The number of fine pores for calculating the average pore area S and the area in the photograph for calculating the fine pore density can be arbitrarily changed from the above-exemplified numerical values according to the sample shape or the pore shape.

In addition, in the case where the number of fine pores can be hardly calculated, for example, where the pore has a bar-like shape, the surface (outer surface or inner surface) or cross-section was observed and photographed at a magnification of 30,000 times by a scanning electron microscope, a transparent film or sheet was overlaid on the obtained photograph, and all portions corresponding to a fine pore were filled with oil-based ink, etc. The area of the region corresponding to a fine pore was then determined using an image analyzer. The open pore ratio was calculated directly from the determined area and the area of the photograph used for evaluation.

(7) Pore Diameter (μm) of Layer (B)

With respect to the cross-section of the layer (B), the pore diameter was determined according to the following formula by using the average pore area S (m$^2$) calculated by the method described in (6).

$$\text{Pore diameter (μm) of layer } (B) = (2(S/\pi)^{1/2}) \times 10^6$$

In the case where the number of fine pores can be hardly calculated and the average pore area S cannot be determined, for example, where the pore has a bar-like shape, the pore diameter was calculated by the following method.

The composite hollow fiber membrane was cooled in liquid nitrogen and fractured in a direction (radial direction) perpendicular to the longitudinal direction and in the thickness direction of the membrane by applying a stress. The central part of the layer (B) in the thickness direction of the resulting cross-section was observed by a scanning electron microscope, the obtained photograph was Fourier-transformed, a maximum wave number was determined when plotting the wave number on the abscissa and the strength on the ordinate, and the pore diameter was obtained from the inverse number thereof. At this time, the image size of the scanning electron micrograph is a square having a side length of 20 to 100 times the pore diameter.

(8) Permeation Performance (Membrane Permeation Flux (L/m$^2$/day))

The composite hollow fiber membrane hydrophilized by immersion in a 10 wt % aqueous solution of isopropyl alcohol for 1 hour. An aqueous sodium chloride solution adjusted to a concentration of 500 mg/l, a temperature of 25° C. and a pH of 6.5 was fed thereto at an operation pressure of 0.50 MPa, thereby performing a membrane filtration treatment. Based on the permeate amount obtained, the membrane permeation flux was determined according to the following formula:

$$\text{Membrane permeation flux (L/m}^2\text{/day)} = \text{permeate amount per day/membrane area}$$

(9) Separation Performance (Salt Rejection Ratio (%))

A membrane filtration treatment was performed under the same conditions as in the case of membrane permeation flux, and the salt concentration of the obtained permeate was measured. From the measured salt concentration of permeate and the salt concentration of feed water, the salt rejection ratio was determined based on the following formula. Incidentally, the salt concentration of permeate was determined from the measured value of electric conductivity.

$$\text{Salt rejection ratio (\%)} = 100 \times \{1 - (\text{sodium chloride concentration in permeate/sodium chloride concentration in feed water})\}$$

Here, in (7) and (8) above, the membrane filtration treatment was performed by manufacturing a small-sized module as follows.

Composite hollow fiber membranes were bundled, inserted into a plastic pipe, and sealed by injecting a thermosetting resin into the pipe and curing it at the ends. Opening faces of hollow fiber membranes were obtained by cutting the ends of the sealed hollow fiber membranes to prepare the small-sized module for evaluation, having a membrane area on an outer diameter basis of about 0.1 m$^2$.

(10) Tensile Modulus (MPa)

In an environment at a temperature of 20° C. and a humidity of 65%, using a tensile tester (Tensilon UCT-100, manufactured by Orientec Co., Ltd.), measurement was performed under conditions of a sample length of 100 mm and a tension rate of 100 mm/min and as for the rest, according to the method prescribed in "JIS L 1013: 2010, Testing methods for man-made filament yarns, 8.10 Initial tensile resistance". The apparent Young's modulus calculated from the initial tensile resistance was taken as the tensile modulus (MPa). The number of measurements was 5, and the average value thereof was employed.

(11) Stress (MPa) at 5% Elongation

In an environment at a temperature of 20° C. and a humidity of 65%, using a tensile tester (Tensilon UCT-100, manufactured by Orientec Co., Ltd.), measurement was performed under conditions of a sample length of 100 mm and a tension rate of 100 mm/min and as for the rest, according to the method prescribed in "JIS L 1013: 2010, Testing methods for man-made filament yarns, 8.5 Tensile strength and elongation percentage", and the stress (MPa) at 5% elongation was thereby measured. The number of measurements was 5, and the average value thereof was taken as the stress at 5% elongation.

(12) Tensile Strength (MPa)

In an environment at a temperature of 20° C. and a humidity of 65%, using a tensile tester (Tensilon UCT-100, manufactured by Orientec Co., Ltd.), measurement was performed under conditions of a sample length of 100 mm and a tension rate of 100 mm/min and as for the rest, according to the method prescribed in "JIS L 1013: 2010, Testing methods for man-made filament yarns, 8.5 Tensile strength and elongation percentage", and the tensile strength (breaking strength) (MPa) was calculated from the tensile tenacity. The number of measurements was 5, and the average value thereof was taken as the tensile strength.

[Cellulose Ester (C)]

(C1)

240 Parts by weight of acetic acid and 67 parts by weight of propionic acid were added to 100 parts by weight of cellulose (cotton linter) and mixed at 50° C. for 30 minutes. The mixture was cooled to room temperature and then 172 parts by weight of acetic anhydride cooled in an ice bath and 168 parts by weight of propionic anhydride were added as esterifying agents, and, 4 parts by weight of sulfuric acid was added as an esterifying catalyst and stirred for 150 minutes. The esterification reaction was thus performed. In the esterification reaction, when the temperature exceeded 40° C., the system was cooled in a water bath. After the reaction, a mixed solution of 100 parts by weight of acetic acid and 33 parts by weight of water as a reaction terminator was added over 20 minutes to hydrolyze an excessive anhydride. Thereafter, 333 parts by weight of acetic acid and 100 parts by weight of water were added, and the mixture was stirred at 80° C. for 1 hour. After the completion of reaction, an aqueous solution containing 6 parts by weight of sodium carbonate was added, and the precipitated cellulose acetate propionate was separated by filtration, subsequently washed with water, and then dried at 60° C. for 4 hours. In the obtained cellulose acetate propionate, the average degrees of substitution of an acetyl group and a propionyl group were 1.9 and 0.7, respectively, and the weight average molecular weight (Mw) thereof was 178,000.

(C2)

Cellulose acetate (LT35) produced by Daicel Corporation, degree of substitution: 2.90

[Plasticizer (P) for Cellulose Ester]

(P1)

Polyethylene glycol having a weight average molecular weight of 600

[Antioxidant (O)]

(O1)

Bis (2,6-di-tert-butyl-4-methylphenyl) pentaerythritol diphosphite

[Hydrophilic Resin (H)]

(H1)

Polyethylene glycol having a weight average molecular weight of 8,300

(H2)

Polyvinylpyrrolidone, K17

[Production of Composite Hollow Fiber Membrane]

Example 1

74 wt % of cellulose ester (C1), 25.9 wt % of polyethylene glycol (P1) having a weight average molecular weight of 600, and 0.1 wt % of bis(2,6-di-tert-butyl-4-methylphenyl) pentaerythritol diphosphite (O1) as an antioxidant were melt-kneaded at 240° C. in a twin-screw extruder, homogenized and then pelletized to obtain a resin composition (a) for the layer (A). The pellet was vacuum-dried at 80° C. for 8 hours.

In addition, 74 wt % of cellulose ester (C1), 17.9 wt % of polyethylene glycol (P1) having a weight average molecular weight of 600, 0.1 wt % of bis(2,6-di-tert-butyl-4-methylphenyl)pentaerythritol diphosphite (O1) as an antioxidant, and 8 wt % of polyethylene glycol (H1) having a weight average molecular weight of 8,300 were melt-kneaded at 240° C. in a twin-screw extruder, homogenized and then pelletized to obtain a resin composition (b) for the layer (B). The pellet was vacuum-dried at 80° C. for 8 hours.

The dried pellet of the resin composition (a) for the layer (A) and the dried pellet of the resin composition (b) for the layer (B) were each fed to separate twin-screw extruders, melt-kneaded at 230° C., adjusted by a gear pump to a discharge rate of 2.4 g/min for the resin composition (a) and 24 g/min for the resin composition (b). Then the pellets were introduced into a spinneret with a multi-annular nozzle having a gas channel arranged in the central part thereof, such that the outer layer becomes the layer (A) and the inner layer becomes the layer (B), and compounded within the spinneret. Thereafter the compounded composition was spun downward from spinneret holes (outer diameter: 4.6 mm, inner diameter: 3.7 mm, slit width: 0.45 mm, number of holes: 4). The spun-out hollow fiber membranes were introduced into a cooling apparatus (chimney) such that the distance L from a lower surface of the spinneret to an upper end of the cooling apparatus becomes 30 mm, cooled with cooling air at 25° C. and an air speed of 1.5 m/sec, and bundled by applying an oil solution, and the spun-out yarn was then wound by a winder at a draft ratio of 400. The structure and physical properties of the obtained composite hollow fiber membrane are shown in Table 1.

Incidentally, in the composite hollow fiber membrane of this Example, it was confirmed from the change in weight between before and after immersion in a 10 wt % aqueous solution of isopropyl alcohol for 1 hour that the whole amount of each of polyethylene glycol having a weight average molecular weight of 600 added as a plasticizer at the time of melt spinning and polyethylene glycol having a weight average molecular weight of 8,300 was eluted from the composite hollow fiber membrane.

Example 2

A composite hollow fiber membrane was obtained in the same manner as in Example 1 except that as the resin composition (b) for the layer (B), 74 wt % of cellulose ester (C1), 13.9 wt % of polyethylene glycol (P1) having a weight average molecular weight of 600, 0.1 wt % of bis(2,6-di-tert-butyl-4-methylphenyl) pentaerythritol diphosphite (O1) as an antioxidant, and 12 wt % of polyethylene glycol (H1)

having a weight average molecular weight of 8,300 were used. The structure and physical properties of the obtained composite hollow fiber membrane are shown in Table 1.

Example 3

A composite hollow fiber membrane was obtained in the same manner as in Example 2 except that as the resin composition (a) for the layer (A), 74 wt % of cellulose ester (C1), 21.9 wt % of polyethylene glycol (P1) having a weight average molecular weight of 600, 0.1 wt % of bis(2,6-di-tert-butyl-4-methylphenyl) pentaerythritol diphosphite (O1) as an antioxidant, and 4 wt % of polyethylene glycol (H1) having a weight average molecular weight of 8,300 were used. The structure and physical properties of the obtained composite hollow fiber membrane are shown in Table 1.

Example 4

A composite hollow fiber membrane was obtained in the same manner as in Example 1 except that the draft ratio was changed to 800. The structure and physical properties of the obtained composite hollow fiber membrane are shown in Table 1.

Example 5

A composite hollow fiber membrane was obtained in the same manner as in Example 1 except that the draft ratio was changed to 200. The structure and physical properties of the obtained composite hollow fiber membrane are shown in Table 1.

Example 6

74 wt % of cellulose ester (C1), 25.9 wt % of polyethylene glycol (P1) having a weight average molecular weight of 600, and 0.1 wt % of bis(2,6-di-tert-butyl-4-methylphenyl) pentaerythritol diphosphite (O1) as an antioxidant were melt-kneaded at 240° C. in a twin-screw extruder, homogenized and then pelletized to obtain a resin composition (a) for the layer (A). The pellet was vacuum-dried at 80° C. for 8 hours.

In addition, 50 wt % of cellulose ester (C1), 19.9 wt % of polyethylene glycol (P1) having a weight average molecular weight of 600, 0.1 wt % of bis(2,6-di-tert-butyl-4-methylphenyl)pentaerythritol diphosphite (O1) as an antioxidant, and 30 wt % of polyvinylpyrrolidone (H2) were melt-kneaded at 240° C. in a twin-screw extruder, homogenized and then pelletized to obtain a resin composition (b) for the layer (B). The pellet was vacuum-dried at 80° C. for 8 hours.

The dried pellet of the resin composition (a) for the layer (A) and the dried pellet of the resin composition (b) for the layer (B) were each fed to separate twin-screw extruders, melt-kneaded at 230° C., adjusted by a gear pump to a discharge rate of 2.4 g/min for the resin composition (a) and 24 g/min for the resin composition (b) Then the pellets were introduced into a spinneret with a multi-annular nozzle having a gas channel arranged in the central part thereof, such that the outer layer becomes the layer (A) and the inner layer becomes the layer (B), and compounded within the spinneret at 190° C. The compounded composition was thereafter spun downward from spinneret holes (outer diameter: 4.6 mm, inner diameter: 3.7 mm, slit width: 0.45 mm, number of holes: 4). The spun-out hollow fiber membranes were introduced into a cooling apparatus (chimney) such that the distance L from a lower surface of the spinneret to an upper end of the cooling apparatus becomes 30 mm, cooled with cooling air at 25° C. and an air speed of 1.5 m/sec, and bundled by applying an oil solution, and the spun-out yarn was then wound by a winder at a draft ratio of 400. The structure and physical properties of the obtained composite hollow fiber membrane are shown in Table 1.

Incidentally, in the composite hollow fiber membrane of this Example, it was confirmed from the change in weight between before and after immersion in a 10 wt % aqueous solution of isopropyl alcohol for 1 hour that the whole amount of each of polyethylene glycol having a weight average molecular weight of 600 added as a plasticizer at the time of melt spinning and polyvinylpyrrolidone was eluted from the composite hollow fiber membrane.

Example 7

A spun-out yarn was obtained in the same manner as in Example 1 except that the draft ratio was changed to 100. This spun-out yean was heated to 120° C. by passing it through a dry heat oven, drawn at a draw ratio of 1.8 times by utilizing a peripheral speed difference between rolls, and wound to obtain a composite hollow fiber membrane. The structure and physical properties of the obtained composite hollow fiber membrane are shown in Table 1.

Example 8

A spun-out yarn was obtained in the same manner as in Example 6 except that the draft ratio was changed to 100. This spun-out yean was heated to 120° C. by passing it through a dry heat oven, drawn at a draw ratio of 1.8 times by utilizing a peripheral speed difference between rolls, and wound to obtain a composite hollow fiber membrane. The structure and physical properties of the obtained composite hollow fiber membrane are shown in Table 1. Incidentally, in the composite hollow fiber membrane of this Example, it was confirmed from the change in weight between before and after immersion in a 10 wt % aqueous solution of isopropyl alcohol for 1 hour that the whole amount of each of polyethylene glycol having a weight average molecular weight of 600 added as a plasticizer at the time of melt spinning and polyvinylpyrrolidone was eluted from the composite hollow fiber membrane.

Comparative Example 1

A composite hollow fiber membrane was obtained in the same manner as in Example 1 except that the resin composition (b) for the layer (B) was not used and the resin composition (a) was adjusted by a gear pump to a discharge rate of 26.4 g/min. The structure and physical properties of the obtained composite hollow fiber membrane are shown in Table 1.

Comparative Example 2

A composite hollow fiber membrane was obtained in the same manner as in Example 3 except that the draft ratio was changed to 80. The structure and physical properties of the obtained composite hollow fiber membrane are shown in Table 1.

Incidentally, in the composite hollow fiber membrane of this Example, it was confirmed from the change in weight between before and after immersion in a 10 wt % aqueous solution of isopropyl alcohol for 1 hour that the whole amount of each of polyethylene glycol having a weight average molecular weight of 600 added as a plasticizer at the time of melt spinning and polyethylene glycol having a weight average molecular weight of 8,300 was eluted from the composite hollow fiber membrane.

Comparative Example 3

Spinning was attempted in the same manner as in Comparative Example 1 except that the draft ratio was changed to 800, but yarn breakage occurred between the spinneret and the winder, and a composite hollow fiber membrane could not be obtained.

Comparative Example 4

A spun-out yarn was obtained in the same manner as in Comparative Example 1 except that the draft ratio was changed to 100. This spun-out yean was heated to 120° C. by passing it through a dry heat oven and attempted to be drawn at a draw ratio of 1.8 times by utilizing a peripheral speed difference between rolls, but yarn breakage occurred during drawing, and a composite hollow fiber membrane could not be obtained.

Comparative Example 5

41 wt % of cellulose ester (C2), 49.9 wt % of N-methyl-2-pyrrolidone, 8.8 wt % of ethylene glycol and 0.3 wt % of benzoic acid were dissolved at 180° C. The obtained solution was defoamed under reduced pressure, then spun downward from spinneret holes (a type of forming one discharge hole by arranging 3 arcuate slit parts) at 160° C. and after a time of exposure to air of 0.03 seconds, solidified in a bath at 12° C. containing N-methyl-2-pyrrolidone/ethylene glycol/water=4.25 wt %/0.75 wt %/95 wt %, followed by washing in water. Thereafter, a heat treatment was performed in water at 60° C. for 40 minutes to obtain a hollow fiber membrane having an outer diameter of 167 μm and an inner diameter of 83 μm.

The obtained hollow fiber membrane has the membrane permeation flux of 54.7 L/m$^2$/day, the salt rejection ratio of 95.8%, the tensile modulus of 1,435 MPa, the stress at 5% elongation of 28 MPa, and the tensile strength of 72 MPa. In addition, the obtained hollow fiber membrane was not a composite hollow fiber membrane but was a so-called asymmetric membrane having a heterogeneous cross-section structure.

Incidentally, in the hollow fiber membranes of Examples 2 to 5 and 7 and Comparative Examples 1 and 2, it was confirmed from the change in weight between before and after immersion in a 10 wt % aqueous solution of isopropyl alcohol for 1 hour that the whole amount of each of polyethylene glycol having a weight average molecular weight of 600 added as a plasticizer at the time of melt spinning and polyethylene glycol having a weight average molecular weight of 8,300 was eluted from the composite hollow fiber membrane.

In addition, the cross-sections of the hollow fiber membranes of Examples 1 to 8 and Comparative Examples 1 and 2 showed that the cross-section structure was homogeneous in all layers.

In the composite hollow fiber membranes of Examples 1 to 8, the membrane permeation flux was high and the permeation performance was good. Furthermore, the salt rejection ratio was high to provide good separation performance, and the tensile strength was also high to provide good membrane strength.

On the other hand, in the composite hollow fiber membrane of Comparative Example 1 where the layer (B) is not formed and the thickness of the layer (A) is large and outside the scope of the present invention, the permeation performance was poor compared with Examples. In the composite hollow fiber membrane of Comparative Example 2 where the tensile modulus is less than 1,000 MPa and outside the scope of the present invention, the salt rejection ratio was low compared with Examples, resulting in poor separation performance. Furthermore, in the composite hollow fiber membrane of Comparative Example 2, the tensile strength was also low, resulting in poor membrane strength.

TABLE 1

|  |  |  |  | Example 1 | Example 2 | Example 3 | Example 4 |
|---|---|---|---|---|---|---|---|
| Resin composition | Layer (A) | Cellulose ester | kind | C1 | C1 | C1 | C1 |
|  |  |  | wt % | 74 | 74 | 74 | 74 |
|  |  | Plasticizer for cellulose ester | kind | P1 | P1 | P1 | P1 |
|  |  |  | wt % | 25.9 | 25.9 | 21.9 | 25.9 |
|  |  | Antioxidant | kind | O1 | O1 | O1 | O1 |
|  |  |  | wt % | 0.1 | 0.1 | 0.1 | 0.1 |
|  |  | Hydrophilic resin | kind | — | — | H1 | — |
|  |  |  | wt % | — | — | 4 | — |
|  | Layer (B) | Cellulose ester | kind | C1 | C1 | C1 | C1 |
|  |  |  | wt % | 74 | 74 | 74 | 74 |
|  |  | Plasticizer for cellulos ester | kind | P1 | P1 | P1 | P1 |
|  |  |  | wt % | 17.9 | 13.9 | 13.9 | 17.9 |
|  |  | Antioxidant | kind | O1 | O1 | O1 | O1 |
|  |  |  | wt % | 0.1 | 0.1 | 0.1 | 0.1 |
|  |  | Hydrophilic resin | kind | H1 | H1 | H1 | H1 |
|  |  |  | wt % | 8 | 12 | 12 | 8 |
| Production conditions |  | Spinning temperature | ° C. | 230 | 230 | 230 | 230 |
|  |  | Draft ratio | — | 400 | 400 | 400 | 800 |
|  |  | Drawing temperature | ° C. | — | — | — | — |
|  |  | Draw ratio | — | — | — | — | — |
| Structure of composite hollow fiber membrane | Layer (A) | Cross-section structure | — | homogeneous | homogeneous | homogeneous | homogeneous |
|  |  | Thickness | μm | 1.4 | 1.4 | 1.4 | 0.5 |
|  |  | Open pore ratio $H_A$ | % | 0.0 | 0.0 | 3.5 | 0.0 |
|  | Layer (B) | Cross-section structure | — | homogeneous | homogeneous | homogeneous | homogeneous |
|  |  | Open pore ratio $H_B$ | % | 6.8 | 10.4 | 10.7 | 8.8 |
|  |  | Pore diameter | μm | 0.09 | 0.10 | 0.10 | 0.06 |
|  |  | Continuous pore | — | none | none | none | none |

TABLE 1-continued

|  |  |  |  |  |  |  |  |
|---|---|---|---|---|---|---|---|
|  |  | Layer configuration (outer layer/inner layer) | — | — | A/B | A/B | A/B | A/B |
|  |  | Outer diameter | μm | 90 | 95 | 94 | 38 |
|  |  | Inner diameter | μm | 52 | 58 | 56 | 26 |
| Physical properties of composite hollow fiber membrane |  | Membrane permeation flux | L/m²/day | 15.7 | 16.9 | 30.4 | 33.3 |
|  |  | Salt rejection ratio | % | 93.7 | 92.2 | 94.5 | 96.8 |
|  |  | Tensile modulus | MPa | 1,588 | 1,503 | 1,430 | 2,055 |
|  |  | Stress at 5% elongation | MPa | 39 | 34 | 30 | 46 |
|  |  | Tensile strength | MPa | 96 | 89 | 82 | 115 |

|  |  |  |  | Example 5 | Example 6 | Example 7 | Example 8 |
|---|---|---|---|---|---|---|---|
| Resin composition | Layer (A) | Cellulose ester | kind | C1 | C1 | C1 | C1 |
|  |  |  | wt % | 74 | 74 | 74 | 74 |
|  |  | Plasticizer for cellulose ester | kind | P1 | P1 | P1 | P1 |
|  |  |  | wt % | 25.9 | 25.9 | 25.9 | 25.9 |
|  |  | Antioxidant | kind | O1 | O1 | O1 | O1 |
|  |  |  | wt % | 0.1 | 0.1 | 0.1 | 0.1 |
|  |  | Hydrophilic resin | kind | — | — | — | — |
|  |  |  | wt % | — | — | — | — |
|  | Layer (B) | Cellulose ester | kind | C1 | C1 | C1 | C1 |
|  |  |  | wt % | 74 | 50 | 74 | 50 |
|  |  | Plasticizer for cellulose ester | kind | P1 | P1 | P1 | P1 |
|  |  |  | wt % | 17.9 | 19.9 | 17.9 | 19.9 |
|  |  | Antioxidant | kind | O1 | O1 | O1 | O1 |
|  |  |  | wt % | 0.1 | 0.1 | 0.1 | 0.1 |
|  |  | Hydrophilic resin | kind | H1 | H2 | H1 | H2 |
|  |  |  | wt % | 8 | 30 | 8 | 30 |
| Production conditions |  | Spinning temperature | ° C. | 230 | 230 | 230 | 230 |
|  |  | Draft ratio | — | 200 | 400 | 100 | 100 |
|  |  | Drawing temperature | ° C. | — | — | 120 | 120 |
|  |  | Draw ratio | — | — | — | 1.8 | 1.8 |
| Structure of composite hollow fiber membrane | Layer (A) | Cross-section structure | — | homogeneous | homogeneous | homogeneous | homogeneous |
|  |  | Thickness | μm | 3.1 | 1.1 | 2.2 | 2.0 |
|  |  | Open pore ratio $H_A$ | % | 0.0 | 0.0 | 0.0 | 0.0 |
|  | Layer (B) | Cross-section structure | — | homogeneous | homogeneous | homogeneous | homogeneous |
|  |  | Open pore ratio $H_B$ | % | 6.1 | 26.8 | 7.5 | 24.2 |
|  |  | Pore diameter | μm | 0.10 | 0.04 | 0.08 | 0.05 |
|  |  | Continuous pore | — | none | formed | none | formed |
|  |  | Layer configuration (outer layer/inner layer) | — | A/B | A/B | A/B | A/B |
|  |  | Outer diameter | μm | 239 | 85 | 150 | 148 |
|  |  | Inner diameter | μm | 170 | 60 | 102 | 99 |
| Physical properties of composite hollow fiber membrane |  | Membrane permeation flux | L/m²/day | 8.4 | 31.2 | 10.2 | 20.9 |
|  |  | Salt rejection ratio | % | 91.0 | 93.4 | 99.5 | 99.1 |
|  |  | Tensile modulus | MPa | 1,291 | 1,514 | 6,340 | 5,847 |
|  |  | Stress at 5% elongation | MPa | 31 | 37 | 85 | 80 |
|  |  | Tensile strength | MPa | 84 | 95 | 213 | 187 |

|  |  |  |  | Comparative Example 1 | Comparative Example 2 | Comparative Example 3 | Comparative Example 4 |
|---|---|---|---|---|---|---|---|
| Resin composition | Layer (A) | Cellulose ester | kind | C1 | C1 | C1 | C1 |
|  |  |  | wt % | 74 | 74 | 74 | 74 |
|  |  | Plasticizer for cellulose ester | kind | P1 | P1 | P1 | P1 |
|  |  |  | wt % | 25.9 | 21.9 | 25.9 | 25.9 |
|  |  | Antioxidant | kind | O1 | O1 | O1 | O1 |
|  |  |  | wt % | 0.1 | 0.1 | 0.1 | 0.1 |
|  |  | Hydrophilic resin | kind | — | H1 | — | — |
|  |  |  | wt % | — | 4 | — | — |
|  | Layer (B) | Cellulose ester | kind | — | C1 | — | — |
|  |  |  | wt % | — | 74 | — | — |
|  |  | Plasticizer for cellulose ester | kind | — | P1 | — | — |
|  |  |  | wt % | — | 13.9 | — | — |
|  |  | Antioxidant | kind | — | O1 | — | — |
|  |  |  | wt % | — | 0.1 | — | — |
|  |  | Hydrophilic resin | kind | — | H1 | — | — |
|  |  |  | wt % | — | 12 | — | — |
| Production conditions |  | Spinning temperature | ° C. | 230 | 230 | 230 | 230 |
|  |  | Draft ratio | — | 400 | 80 | 800 | 100 |
|  |  | Drawing temperature | ° C. | — | — | — | 120 |
|  |  | Draw ratio | — | — | — | — | 1.8 |
| Structure of composite hollow fiber membrane | Layer (A) | Cross-section structure | — | homogeneous | homogeneous | yarn breakage | yarn breakage |
|  |  | Thickness | μm | 19.0 | 4.6 |  |  |
|  |  | Open pore ratio $H_A$ | % | 0.0 | 3.4 |  |  |
|  | Layer (B) | Cross-section structure | — | — | homogeneous |  |  |
|  |  | Open pore ratio $H_B$ | % | — | 10.2 |  |  |
|  |  | Pore diameter | μm | — | 0.15 |  |  |
|  |  | Continuous pore | — | — | none |  |  |

TABLE 1-continued

|  |  |  |  | A | A/B |
|---|---|---|---|---|---|
|  | Layer configuration (outer layer/inner layer) | — | | A | A/B |
|  | Outer diameter | μm | | 104 | 345 |
|  | Inner diameter | μm | | 66 | 242 |
| Physical | Membrane permeation flux | L/m²/day | | 1.3 | 5.3 |
| properties of | Salt rejection ratio | % | | 93.9 | 78.5 |
| composite hollow | Tensile modulus | MPa | | 1,638 | 974 |
| fiber membrane | Stress at 5% elongation | MPa | | 38 | 23 |
|  | Tensile strength | MPa | | 97 | 58 |

While the invention has been described in detail and with reference to specific embodiments thereof, it will be apparent to one skilled in the art that various changes and modifications can be made therein without departing from the spirit and scope of the invention. This application is based on Japanese Patent Application (Patent Application No. 2015-091194) filed on Apr. 28, 2015, the entirety of which is incorporated herein by way of reference.

INDUSTRIAL APPLICABILITY

The present invention provides a composite hollow fiber membrane that is excellent in permeation performance and separation performance, has high membrane strength, and can be easily produced, and a method for producing the same. The hollow fiber membrane of the present invention can be used as a water treatment membrane for producing industrial water or drinking water from seawater, brine water, sewage water, wastewater, etc., a medical membrane for artificial kidney, plasma separation, etc., a membrane for food-beverage industry such as fruit juice concentration, a gas separation membrane for separating exhaust gas, carbonic acid gas, etc., and a membrane for electronic industry such as fuel cell separator. As for the type of the water treatment membrane above, the present invention can be preferably used for a microfiltration membrane, an ultrafiltration membrane, a nanofiltration membrane, a reverse osmosis membrane, a forward osmosis membrane, etc.

The invention claimed is:

1. A composite hollow fiber membrane comprising at least a layer (A) and a layer (B), wherein:
   the composite hollow fiber membrane has an outer diameter of 20 to 350 μm and an inner diameter of 14 to 250 μm,
   a tensile modulus of the composite hollow fiber membrane is from 1,000 to 6,500 MPa, the layer (A) contains a cellulose ester,
   a thickness of the layer (A) is from 0.01 to 5 μm, and
   an open pore ratio $H_A$ of the layer (A) and an open pore ratio $H_B$ of the layer (B) satisfy $H_A<H_B$, the open pore ratio $H_A$ of the layer (A) is from 0 to 10%, and the open pore ratio of $H_B$ of the layer (B) is from 5 to 55%.

2. The composite hollow fiber membrane according to claim 1, wherein an outermost layer of the composite hollow fiber membrane is the layer (A).

3. The composite hollow fiber membrane according to claim 1, wherein the layer (B) contains a cellulose ester.

4. The composite hollow fiber membrane according to claim 1, wherein the cellulose ester contained in the layer (A) is at least one compound selected from the group consisting of cellulose acetate propionate and cellulose acetate butyrate.

5. The composite hollow fiber membrane according to claim 1, wherein the cellulose ester contained in the layer (B) is at least one compound selected from the group consisting of cellulose acetate propionate and cellulose acetate butyrate.

6. The composite hollow fiber membrane according to claim 1, wherein the layer (B) has a continuous pore.

7. The composite hollow fiber membrane according to claim 1, having a stress at 5% elongation in a longitudinal direction thereof of 30 MPa or more.

8. The composite hollow fiber membrane according to claim 1, having a salt rejection ratio of from 90.0 to 99.9% at the time of filtrating an aqueous solution having a sodium chloride concentration of 500 mg/l at 25° C. and a pressure of 0.5 MPa.

9. A method for producing the composite hollow fiber membrane of claim 1 comprising the following steps 1 to 3:
   1. a step of heating and thereby melting a resin composition constituting each of the layers of the composite hollow fiber membrane, in which a resin composition constituting at least one of the layers contains the cellulose ester,
   2. a step of combining and thereby compounding the melted resin compositions of respective layers within a spinneret having a multi-annular nozzle where a gas channel is arranged in a central part thereof, and
   3. a step of either
      winding the compounded resin composition at a draft ratio of 200 to 1,000 while discharging it into air from the multi-annular nozzle, or
      spinning out the compounded resin composition at a draft ratio of 10 to 200 to obtain a hollow fiber membrane, drawing the hollow fiber membrane at a ratio of 1.1 to 2.5 times, and subsequently winding the hollow fiber membrane.

* * * * *